Sept. 7, 1943.   H. B. HOLTHOUSE   2,328,805
VALVE MECHANISM
Filed June 13, 1941
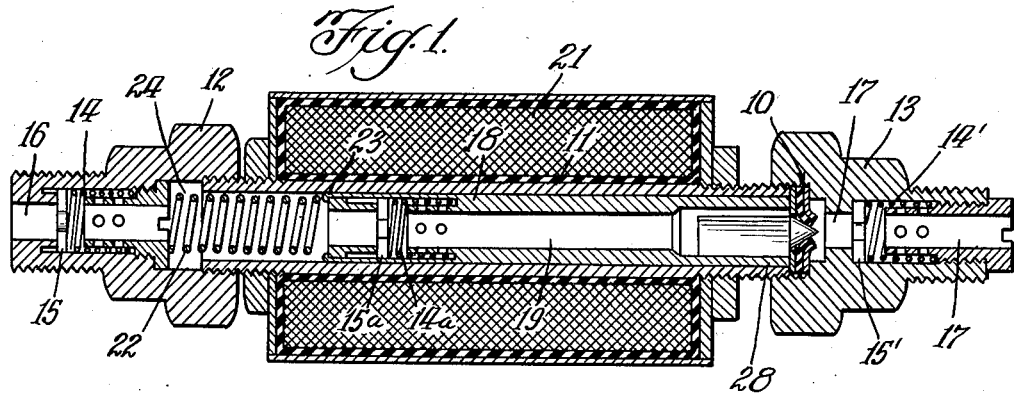
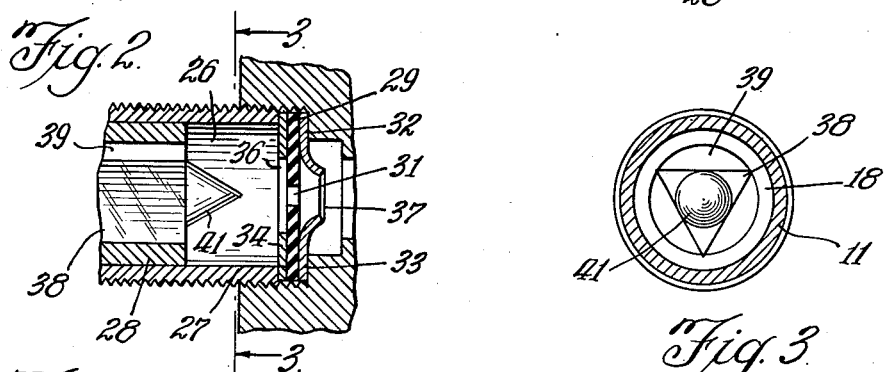
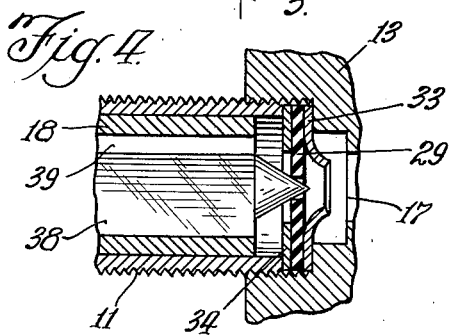
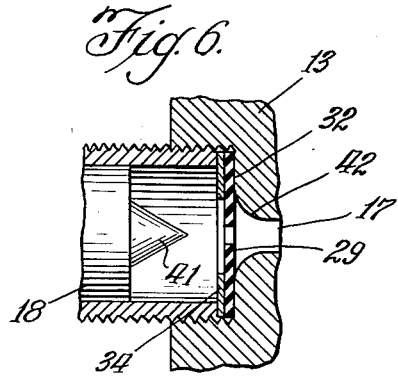
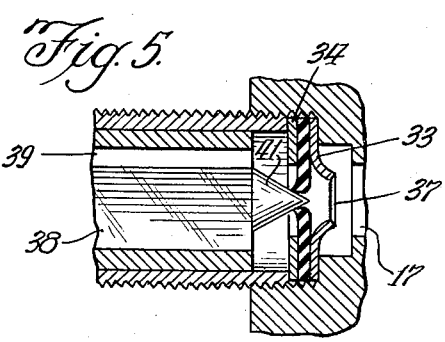
Inventor:
Harry B. Holthouse
By Foorman L. Mueller
Atty.

Patented Sept. 7, 1943

2,328,805

UNITED STATES PATENT OFFICE 2,328,805

VALVE MECHANISM

Harry B. Holthouse, Chicago, Ill., assignor to Galvin Manufacturing Corporation, Chicago, Ill., a corporation of Illinois Application June 13, 1941, Serial No. 397,949

1 Claim. (Cl. 251—27)

This invention relates generally to valve mechanisms and in particular to a valve assembly having a resilient valve seat adapted to retain a seating engagement with a cooperating valve member over a portion of the movement of the valve member away from a normal seating position.

It is an object of this invention to provide an improved valve mechanism.

Another object of this invention is to provide an improved valve assembly which is simple and compact in design, rugged in construction, and applicable to function satisfactorily for either "cut off" or "lock out" purposes.

A further object of this invention is to provide an improved valve unit in which the cooperating valve parts may be machined with relatively large tolerances and assembled with appreciable misalignment therebetween without in any manner impairing the efficient operation of the unit.

A still further object of this invention is to provide a valve assembly having a resilient valve seat adapted to retain a sealing engagement with its cooperating valve member over a portion of the travel of the valve member in opposite directions.

A particular feature of this invention is found in the provision of a valve assembly having a valve seat comprising a peripherally supported flexible disc element with an opening at the center thereof, which is depressed in one direction on insertion of a cooperating valve in the opening to seal the same, with the walls of the opening during the depression of the center portion frictionally engaging the cooperating valve member so that the center portion is moved in an opposite direction to retain the seal on initial movement of the valve member away from the seat.

Another feature of this invention is found in the provision of a valve assembly in which the valve member is provided with an axially extending passage having an element of triangular section in one end thereof formed with a conical portion which projects from such end for insertion in the center opening of a peripherally supported flexible valve seat, with the insertion of the conical portion in the opening sealing the same and in turn closing the one end of the passage in the valve member.

Further objects, features, and advantages of this invention will become apparent from the following description when taken in connection with the accompanying drawing in which:

Fig. 1 shows the improved valve unit assembled in a pump of reciprocating type;

Fig. 2 is a detail sectional view of the valve mechanism of Fig. 1 showing parts thereof in changed positions;

Fig. 3 is a sectional view taken along the line 3—3 in Fig. 2, showing the construction of the conical portion on the cooperating valve member;

Figs. 4 and 5 are illustrated similarly to Fig. 2 and show parts of the valve assembly in changed positions; and Fig. 6 is a modified form of the valve assembly.

With reference to the drawing, the improved valve mechanism which is designated generally as 10 is illustrated in Fig. 1 with a pump of reciprocating type applicable for use in the fuel system of an internal combustion device and including a casing having a tubular center portion 11 and end portions 12 and 13. Each end portion 12 and 13 is provided with a spring and disc valve structure 14—15 and 14'—15', respectively, which are operated in response to the fluid pressures in the passages 16 and 17 formed in each of the end portions 12 and 13, respectively. The passage 16 is adapted for connection with a suitable source of fluid supply with the fluid from the pump being discharged through the passage 17. The central casing portion 11 has a tubular piston 18 slidable therein which is provided with an axially extending fluid passage 19 with the fluid flow through the passage 19 being controlled at one end by a spring and disc valve structure 14a—15a and at its opposite end by the improved valve assembly 10, which will be later fully described. The movement of the piston 18 in one direction is accomplished by a solenoid 21 positioned about the casing portion 11, and in an opposite direction by a spring 22 which is arranged in compression between the piston end 23 and the valve structure 14—15 and located in a chamber or space 24 formed therebetween.

In the operation of the pump when the solenoid 21 is energized, the piston 18 is moved toward the left, as viewed in Fig. 1, which movement compresses the fluid and the spring 22 in the chamber 24 to provide for the closing of the valve structure 14—15 and the opening of the valve structure 14a—15a. Concurrently with this movement of the piston 18 the valve structure 14'—15' is closed so that the fuel passing through the piston passage 19 from the chamber 24 is collected in the expansible chamber 26 formed in the end 27 of the casing portion 11 by the retraction of the piston end 28 (Fig. 2). On deenergization of the solenoid 21 the piston 18 is returned to its position shown in Fig. 1 by the action of the spring 22, the retraction of the piston end 23 expanding the spring chamber 24 to provide for a flow of fluid therein through the valve structure 14—15. By virtue of the contraction of the chamber 26 and the consequent increase in fluid pressure therein, valve 14a—15a is closed while the valve 14'—15' is opened so that the fluid is discharged from the pump through the passage 17. This cycle of operation is repeated when the solenoid 21 is again energized. It is seen, therefore, that the fluid from the inlet 16 is progressively and uni-directionally moved through the pump by its passage in succession through the inlet passage 16, chamber 24, piston passage 19, expansible chamber 26, and thence out of the pump through the outlet passage 17.

In some instances of pump installation, such as where it is used in a low pressure fuel system, such as the fuel system of an automobile or airplane, the fuel in the supply line and hence at the pump inlet passage 16 may be subject to varying pressures. At times this pressure might exceed the pressures normally exerted by the valve springs 14, 14', and 14a to close their corresponding valves and when the pump is not operating open or crack the valves, and thus provide for a leakage of fuel through the pump. This leakage of fuel through the pump at such times when the pump is not operating, is eliminated by the valve assembly 10 which will now be fully described.

The valve assembly 10 comprises a resilient or flexible disc element 29 having an opening 31 at the center portion thereof and which constitutes the valve seat in the improved assembly. The disc 29 may be composed of rubber, leather or like flexible material and is peripherally supported on an internal shoulder 32 formed about the passage 17 in the end portion 13. Annular rings or washers 33 and 34 are arranged on opposite sides of the disc 29 with the peripheral sealing of the disc 29 being accomplished by clamping the rings 33 and 34 between the shoulder 32 and end 27 of the tubular casing portion 11. This clamping action is obtained in an obvious manner by the threaded engagement of the end 27 of the casing portion 11 within the end portion 13. The casing end 27 abuts the ring 34 which is located within the expansible chamber 26 and formed with an enlarged central aperture 36. It is contemplated that the ring 34 be composed of a material which although stiff is pliable, such as lead or fibre, so as to be readily pressed into a sealing fit with the end 27 of the casing portion 11. The ring 33 may be of metal and is supported directly on the shoulder 32 and formed with a central portion which gradually curves away from the disc 29 toward the passage 17, with the aperture 37 at such central portion and the aperture 36 being in coaxial alignment with, but substantially greater than the opening 31 in the disc 29. By virtue of this construction and assembly of the disc 29 and rings 33 and 34, the disc 29 is rigidly supported at its periphery with the center portion thereof about the opening 31 being flexibly movable in both directions substantially axially of the pump casing for a purpose to be later fully explained.

The pump piston or cooperating valve member 18 for the valve seat 29 has an element 38 of substantially triangular cross section inserted in the passage 19 at the end 28 thereof. The openings 39 (Figs. 2 and 3) on each side of the element 38, therefore, provide fluid passages continuous with the passage 19 for communicating such passage with the expansible chamber 26. The element 38 is integrally formed with a conical portion 41 which projects outwardly from the piston end 28 and is adapted to be inserted in the opening 31 of the valve seat 29 to seal the same and hence close the passage 19 at such end.

In the operation of the valve assembly 10 let it be assumed that the parts thereof are in their positions shown in Fig. 2, namely, a position for the pump at which the solenoid 21 is deenergized and the piston is ready to be moved through its discharge stroke by the spring 22. As the member 18 is moved toward the right as viewed in Fig. 2, fluid is discharged from the expansible chamber 26 through the discharge passage 17 until the conical portion 41 initially engages the disc 29 at the aperture 31 as shown in Fig. 4. It is evident from Fig. 4, that the walls of the opening 31 do not conform in shape or contour with the conical portion 41 so that the initial engagement therebetween occurs in a substantially line contact. This line contact provides a wiping action by the disc 29 relative to the conical portion 41 whereby to clean such portion of any foreign particles which might be adhering thereto. The wiping action continues as the portion 41 moves into the opening 31 to the position shown in Fig. 1.

As the portion 41 is inserted or moved into the opening 31, the central portion of the disc or valve seat 29 is yieldably moved or depressed in the direction of fluid flow, this movement occurring concurrently with a distention of the opening 31 by the portion 41. By virtue of this distention of the opening 31 the side walls thereof frictionally engage the portion 41 in a squeezing or pressing grip. Thus when the working stroke of the member 18 is completed, the seating engagement between the valve seat 29 and valve portion 41 of the valve member 18 is the combined result of a surface engagement between the portion 41 and the valve seat 29 and the gripping of such portion by the valve seat. This position of normal seating engagement is defined by the pressing of the center portion of the disc 29 against the curved surface of the washer 33, the curvature of which conforms substantially to the slope of the conical portion 41.

On energization of the solenoid 21 and as the member 18 is initially moved toward the left, as viewed in Fig. 5, the disc 29 moves concurrently with the valve member 18 to retain the seal by virtue of the frictional gripping of the conical portion 41 by the element 29. The central portion of the disc is thus bent or laterally moved in a direction toward the ring 34. This concurrent movement of the disc 29 with the valve portion 41, and hence the retention of the seal about the opening 31 in the disc 29 continues until the frictional engagement between these parts is broken by the restraining or limiting of further disc movement by the ring 34. The rings 33 and 34 thus function to define the yieldable movement of the disc 29 in opposite directions whereby to materially reduce the wear on the valve seat due to excessive bending thereof and thus lengthen its service life.

From the above description it is clear that the seal between the valve seat 29 and the valve member 18 continues over an appreciable portion of the initial movement of the member 18 from its normal seating position. In instances such as where the pump is mounted on a vibrating structure, as where it is utilized in the fuel system of a mobile craft, the vibration or other incidental causes oftentimes effect a movement of the member 18 in a direction away from the valve seat 29 when the solenoid 21 is deenergized, namely, when the pump is idle. Any movement imparted to the member 18 because of these incidental effects is entirely compensated for by the movement of the valve seat 29 concurrently with the member 18 in such direction so that leakage of fuel through the pump is completely eliminated when the pump is not being operated. During the operation of the pump, therefore, the pump discharge action is stopped upon the closing of the valve assembly 10 so that the valve functions as a discharge "cutoff" device. When the pump is not in operation the frictional engagement of the conical portion 41 with the valve seat 29 serves to maintain these two parts in sealing engagement against any incidental movement of the valve member 18. Any leakage of fuel through the pump at such times when it is not in operation is thus positively prevented by the function of the valve as a "lock out" device. By virtue of the flexibility of the disc 29 in both directions axially of the valve casing the sealing engagement of the portion 41 with the seat 29 is accomplished with relatively low operating pressures, pressures of between two and four pounds per square inch by the spring 24 having been used in one embodiment of the invention. It is to be noted also, that in the assembly of the valve mechanism a precise assembly alignment of the conical portion 41 with the opening 31 is not required since the opening 31 is substantially self-aligning.

A modified form of the invention is shown in Fig. 6 wherein the annular ring 33 is eliminated and the shoulder 32 formed at the inner periphery thereof and at the passage 17 with a curved surface 42 corresponding substantially to the angular slope of the conical portion 41. The curved surface 42 functions in all respects similarly to the ring 33 so that a further description thereof is believed to be unnecessary.

From a consideration of the above description and drawing, the invention is seen to provide a compact valve assembly in which the valve seat is comprised of a flexible or resilient disc element which is adapted to retain a seating engagement with a cooperating valve member over a portion of the travel of the valve member in opposite directions. The seal, therefore, is retained at all times of incidental movement of the valve member from a normal seating position and until the valve is operated to open the same. Although the invention has been described with respect to a particular application thereof, it is apparent that it may be applied to reciprocating type pumps generally, or used as a complete valve unit in a fluid system.

It is to be understood also that although the invention has been described with specific reference to several preferred embodiments thereof, it is not to be so limited since changes therein can be made which are within the full intended scope of the invention as defined by the appended claim.

I claim:

In a valve assembly including a passage, and valve means in said passage at the end thereof including in combination a first disc having an elastic center portion with a cylindrical opening therein, a valve member movable in said passage having a conical portion thereon for seating in said cylindrical opening, a non-yieldable disc on one side of said first disc toward said passage and having an opening of greater diameter than the diameter of said cylindrical opening, another non-yieldable disc on the other side of said first disc having a central portion curved outwardly away from said first disc with an opening centrally of the curved central portion of a diameter greater than the diameter of said cylindrical opening, with said three discs and said valve member conical portion being so constructed and arranged that said cylindrical opening expands laterally and said first disc central portion is moved against said second-named non-yieldable disc curved portion upon full seating of said conical portion in said cylindrical opening, with said cylindrical opening at one portion thereof frictionally gripping said concal portion at said full seated position at said curved portion sufficiently to retain said grip upon withdrawal of said valve member away from said full seated position and upon said withdrawal, said conical portion taking said yieldable central portion therewith into said opening in said first-named non-yieldable disc until said first-named non-yieldable disc breaks said grip, whereby the passage is retained sealed upon a displacement of said valve member conical portion from said full seated position and leakage of liquid therethrough is prevented upon such displacement.

HARRY B. HOLTHOUSE.